May 30, 1961 E. L. MOORE ET AL 2,986,138
GRILL
Filed Nov. 21, 1957 2 Sheets-Sheet 1
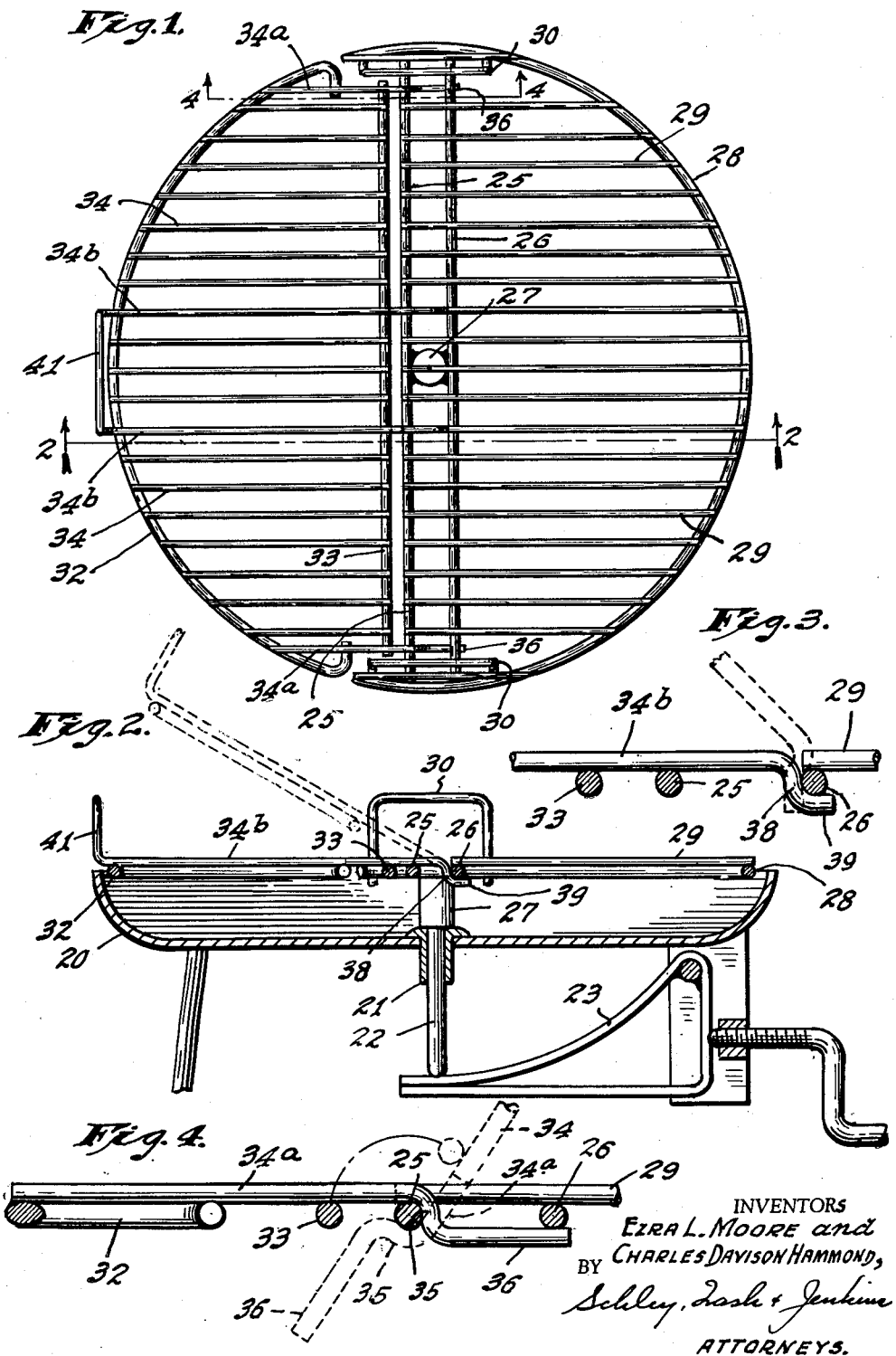
INVENTORS
EZRA L. MOORE and
BY CHARLES DAVISON HAMMOND,
Schley, Losh & Jenkins
ATTORNEYS.

May 30, 1961 E. L. MOORE ET AL 2,986,138
GRILL
Filed Nov. 21, 1957 2 Sheets-Sheet 2
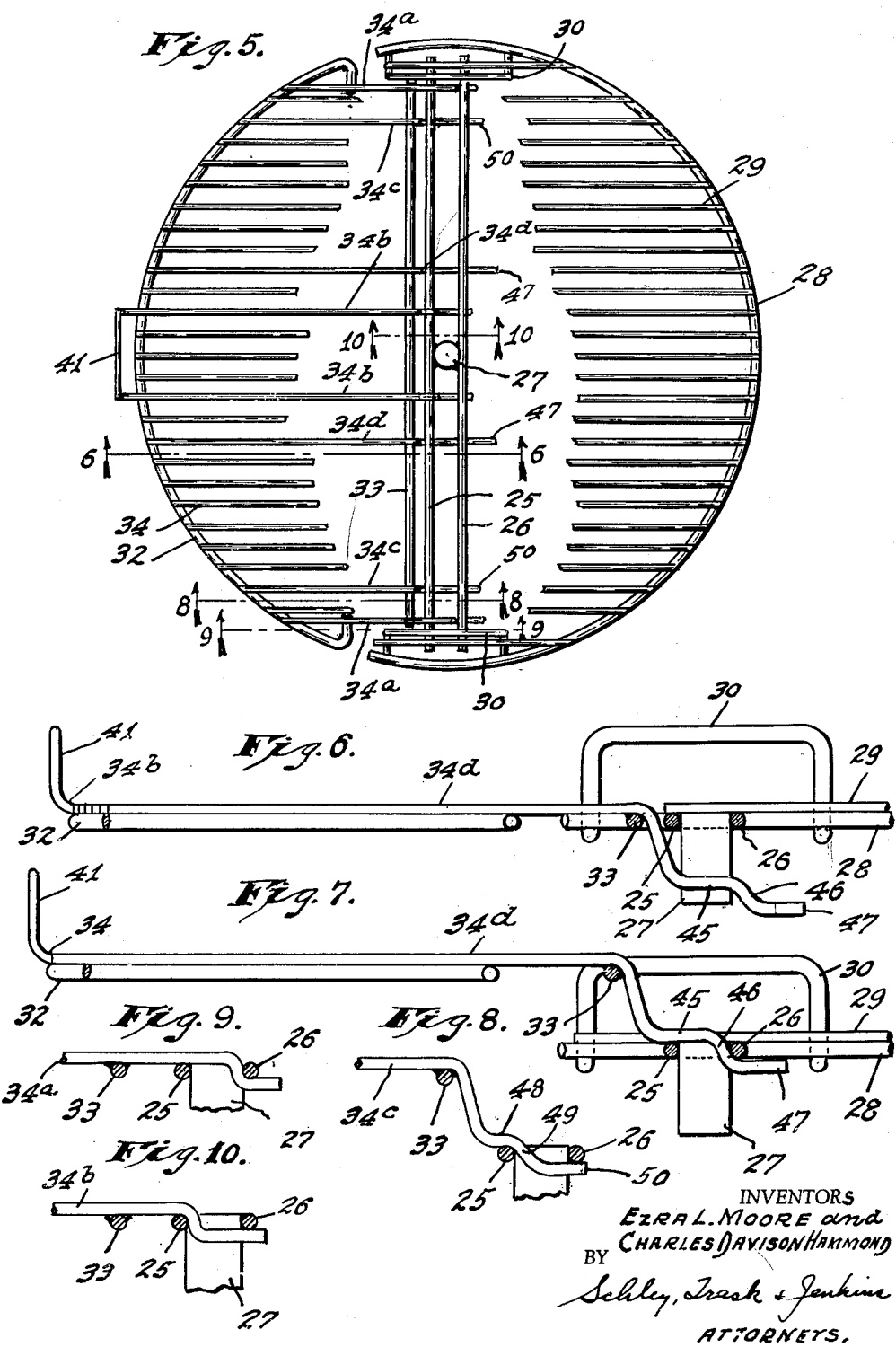
INVENTORS
EZRA L. MOORE and
CHARLES DAVISON HAMMOND
BY
Schley, Trask & Jenkins
ATTORNEYS.

2,986,138
GRILL

Ezra L. Moore and Charles D. Hammond, Columbus, Ind., assignors to Arvin Industries, Inc., Columbus, Ind., a corporation of Indiana
Filed Nov. 21, 1957, Ser. No. 698,011
6 Claims. (Cl. 126—25)

This invention relates to charcoal broilers of the type in which a circular grill is mounted for rotation about a vertical axis above a charcoal bed. Such grills have the the disadvantage that they prevent access to the charcoal bed. Further, the whole grill is exposed to smoke and, in most instances, is of such a size as to be relatively difficult to handle and difficult to clean.

It is an object of this invention to overcome the above noted disadvantages, while, at the same time, retaining all the desirable features of a rotatable grill. Another object of the invention is to provide a grill which will simultaneously support foods or cooking utensils at different elevations above the charcoal bed.

In carrying out the invention in its preferred form, we make the grill in two generally semicircular parts, one of which provides somewhat more than one-half and the other somewhat less than one-half of the total grill area. The first part includes a pair of parallel, spaced bars extending generally diametrically of the grill and rigid with the bearing that supports the grill for rotation. The other grill-part embodies two pairs of rods extending perpendicularly to the bars of the other part and having downwardly offset end portions so that they may be interlocked with said bars to hold the two grill-sections in coplanar relationship. In one embodiment of our invention, the smaller grill-section embodies two additional pairs of rods having offset end portions lying at a different elevation from those of the other rod-set, the arrangement being such that through the use of one set of rods the two grill-sections may be disposed in coplanar relationship while, through the use of the other set, the smaller grill-section may be supported above the larger.

Further objects and features of the invention will become apparent from the following more detailed description and from the drawings in which:

Fig. 1 is a plan view of a grill;

Fig. 2 is a vertical section through a broiler incorporating the grill of Fig. 1;

Fig. 3 is a fragmental section similar to Fig. 2, but on an enlarged scale;

Fig. 4 is a vertical section on the line 4—4 of Fig. 1;

Fig. 5 is a plan view of a double-level grill;

Fig. 6 is a vertical section on the line 6—6 of Fig. 5 showing the two grill-parts in coplanar relation;

Fig. 7 is a section similar to Fig. 6, but showing the two grill-parts at different levels;

Fig. 8 is a vertical section on the line 8—8 of Fig. 5 showing the grill-parts at different levels;

Fig. 9 is a vertical section on the line 9—9 of Fig. 5 showing the two grill-parts in coplanar relation; and Fig. 10 is a vertical section on line 10—10 of Fig. 5 also showing the two parts of the grill in coplanar relation.

The broiler illustrated in Figs. 1 and 2 comprises a charcoal pan 20 supported in any convenient manner and having a centrally located guide bushing 21 which slidably receives a vertical pin 22 adapted to support a grill. Adjusting mechanism 23 of any convenient type controls the vertical position of the pin 22 in the bushing 21 to permit variation of the distance between the grill and the fire.

The grill supported on the upper end of the pin 22 comprises a main part which includes a pair of spaced bars 25 and 26 secured as by welding to a socket 27 which rotatably receives the upper end of the pin 22. The main grill-part also includes a marginal member 28 bent into an arcuate shape of somewhat more than 180° in extent and secured to the bars 25 and 26 adjacent the ends thereof. Rods 29 overlie the bars 25 and 26 and the marginal member 28 and are secured thereto to provide a support for food or cooking utensils. Adjacent the ends of the bars 25 and 26, the main grill-part is desirably provided with bail-like handles 30.

To complete the grill, we provide a supplementary part including an arcuate marginal member 32 which complements the member 28 to complete the circumference of the grill. Extending chordally between points adjacent the ends of the marginal member 32 is a bar 33; and overlying such bar and the member 32 is a series of spaced rods 34 similar in purpose to the rods 29. The rods 34 include a pair 34a, conveniently located adjacent the ends of the bar 33, which project beyond such bar to cooperate with the bars 25 and 26 of the main grill-part to aid in support of the supplemental grill-part therefrom. For this purpose, each bar 34a extends over the bar 25 and beyond such bar has its end portion offset downwardly to provide a vertically extending shoulder 35 and a horizontally extending finger 36 underlying the bar 26 (Fig. 4).

The rods 34 include a second pair 34b which also project beyond the rod 33 into cooperative association with the rods 25 and 26. Each of the bars 34b is offset downwardly adjacent the bar 26 to provide a vertically extending shoulder 38 and a horizontally extending finger 39 underlying the bar 26 (Fig. 3). The offset portions of the rods 34b differ from those of the rods 34a in the location of the shoulders 35 and 38. Both such shoulders are located between the bars 25 and 26, but the shoulders 35 are positioned to engage the bar 25 (Fig. 4) while the shoulders 38 are positioned (Fig. 3) to engage the bar 26.

When the supplemental grill-part is in its operative position, shown in Fig. 1 and in full lines in Fig. 2, the projecting ends of the rods 34a and 34b cooperate with the bars 25 and 26 to support the supplemental grill-part in cantilever fashion and in coplanar relationship with the main grill-part. The shoulders 35 of the rods 34a engage the bar 25 to limit leftward movement of the supplemental grill-part, while the shoulders 38 of the rods 34b engage the bar 26 to limit rightward movement of the supplemental grill-part. Thus, such supplemental grill-part is held in fixed position relative to the main grill-part, and the entire grill may be utilized in the same manner as if it were unitary.

If it is desired to separate the two grill-parts, as might be desired to provide access to the charcoal bed in the pan 20 or to facilitate cleaning of the grill, the supplemental part may be removed from association with the main part by swinging it into the dotted-line position indicated in Fig. 2, thus permitting the offset ends of the rods 34a and 34b to be withdrawn from the space between the two bars 25 and 26. To facilitate handling of the supplemental grill-part when it is removed from the other part, it may be provided with a bail-like handle 41. With the supplemental grill-part removed, the main part remains supported on the rod 22 and may be utilized for cooking purposes.

In the particular arrangement illustrated in the drawing, the rods 34b lie respectively in alignment with two of the rods 29 of the main grill-part. To avoid interference, the two aligned rods 29 terminate at the bar 26, as will be clear from Fig. 3. The rods 34a are shown as located out of alignment with rods 29 on the main grill-part and hence there is no possibility of interference.

The grill shown in Fig. 5 is much the same as that of Figs. 1 to 4 in that it includes a main part comprising the bars 25 and 26, the marginal member 28, and the rods 29, and a supplemental part comprising the bar 33, marginal member 32, and rods 34. As in the other grill, the rods 34 include two pairs 34a and 34b which cooperate with the bars 25 and 26 to locate the main and supplemental grill-parts in coplanar relationship.

The grill of Figs. 5 to 10, however, differs from that of Figs. 1 to 4 in including two additional pairs of rods, respectively designated 34c and 34d, which provide a means through which the supplemental grill-part can be supported in a plane above the main grill-part. For this purpose, each of the rods 34d is formed immediately beyond the bar 33 to provide a downwardly offset, generally horizontal portion 45 the end of which is further offset downwardly to provide a shoulder 46 and a finger 47. Each of the bars 34c, immediately beyond the rod 33 is likewise formed to provide a downwardly offset portion 48, a shoulder 49, and a finger 50. All the horizontal portions 45 and 48 lie in a common plane, while the shoulders 46 and 49 are positioned to cooperate respectively with the rods 26 and 25.

When the two grill-parts are supported in coplanar relationship by cooperation of the rods 34a and 34b with the bars 25 and 26, as shown in Figs. 9 and 10, the inner ends of the rods 34c and 34d project downwardly between the bars 33 and 25, as indicated by Fig. 6 in the case of the rods 34d. It will of course be understood that the bars 33 and 25 are spaced far enough apart so that they will not interfere with swinging movement of the supplemental grill-part necessary to disengage the fingers and shoulders of the rods 34a and 34b from the bars 26 and 25. If it is desired to support the supplemental grill-part at an elevation relative to the main grill-part, the inner ends of the rods 34c and 34d are inserted between the bars 25 and 26 into the positions respectively indicated in Figs. 7 and 8. In that condition, the horizontal portions 45 and 48 rest on the bar 25, the fingers 47 and 50 engage below the bar 26, and the shoulders 46 and 49 cooperate with the bars 26 and 25 to prevent movement of the supplemental grill-part toward or away from the main grill-part and to support the supplemental grill-part at an elevation above the main grill-part. In this condition the grill provides for the support of food and cooking utensils at two different distances from the fire and makes it possible to subject the food and utensils to different temperatures and different cooking rates.

It is not necessary to remove the smaller grill-section completely or to hold it elevated manually to provide access to the charcoal bed beneath it. Instead, such smaller grill-section can be swung upwardly and over the larger section, as to the position shown in dotted lines in Fig. 4, where interengagement of the grill elements will maintain the smaller grill section at an inclined disposition.

We claim as our invention:

1. For use in a charcoal broiler having a pan and a grill-supporting pin projecting upwardly at the center of said pan, a socket adapted to be rotatably received on the upper end of said pin, first and second grill-parts complementing each other to provide an extended cooking surface, said first grill-part being rigidly attached to said socket and including inner and outer bars extending in parallel spaced relation along one edge of the first grill-part on opposite sides of the axis of said socket, said second grill-part including two pairs of spaced rods extending perpendicularly to said two bars and having end portions projecting over and in engagement with the outer bar and being downwardly offset therebeyond to provide a vertically extending shoulder and a finger engaging beneath said inner bar to support the second grill-part in cantilever fashion from the first grill-part, the shoulders of one pair of rods being positioned to engage said outer bar and the shoulders of the other pair of rods being positioned to engage said inner bar.

2. For use in a charcoal broiler having a pan and a grill-supporting pin projecting upwardly at the center of said pan, a socket adapted to be rotatably received on the upper end of said pin, first and second grill-parts complementing each other to provide an extended cooking surface, said first grill-part being rigidly attached to said socket and including inner and outer bars extending in parallel spaced relation along one edge of the first grill-part, said second grill-part including two pairs of spaced rods extending perpendicularly to said two bars and having end portions projecting over and in engagement with the outer bar and being downwardly offset therebeyond to provide a vertically extending shoulder and a finger engaging beneath said inner bar to support the second grill-part in cantilever fashion from the first grill-part, the shoulders of one pair of rods being positioned to engage said outer bar and the shoulders of the other pair of rods being positioned to engage said inner bar.

3. The invention of claim 2 with the addition that the bar-engaging portions of said pairs of rods are so located vertically with respect to the second grill-part as to support such second grill-part in substantially coplanar relation with the first grill-part.

4. The invention of claim 2 with the addition that the bar-engaging portions of said pairs of rods are so located vertically with respect to the second grill-part as to support such second grill-part above the first grill-part.

5. For use in a charcoal broiler having a pan and a grill-supporting pin projecting upwardly at the center of said pan, a socket adapted to be rotatably received on the upper end of said pin, first and second grill-parts complementing each other to provide an extended cooking surface, said first grill-part being rigidly attached to said socket and including inner and outer bars extending in parallel spaced relation along one edge of the first grill-part, said second grill-part including a pair of spaced rods extending perpendicularly to said two bars and having end portions projecting over and in engagement with the outer bar and being downwardly offset therebeyond to provide a finger engaging beneath said inner bar to support the second grill-part in cantilever fashion from the first grill-part.

6. For use in a charcoal broiler having a pan, a first grill-part adapted to cover a portion of said pan, a second grill-part adapted to cover another portion of said pan, said first grill-part including inner and outer bars extending in parallel, spaced relation along one of its edges, said second grill-part including two pairs of spaced, parallel rods projecting from the second grill-part for engagement with said bars, each of said rods including a first portion adapted to rest on said outer bar and a second portion adapted to engage beneath said inner bar to support the second grill-part in cantilever fashion from the first grill-part, the bar-engaging portions of one pair of rods being spaced vertically from those of the other pair of rods.

References Cited in the file of this patent

UNITED STATES PATENTS

| | | |
|---|---|---|
| 842,695 | Peters | Jan. 29, 1907 |
| 856,809 | Sawyer | June 11, 1907 |
| 951,645 | Krystowiak | Mar. 8, 1910 |
| 1,263,863 | Crosby | Apr. 23, 1918 |
| 1,337,043 | Child | Apr. 13, 1920 |
| 1,530,815 | Dear | Mar. 24, 1925 |
| 1,830,230 | Gwyer | Nov. 3, 1931 |
| 2,189,240 | Burr | Feb. 6, 1940 |
| 2,302,984 | Tollzien | Nov. 24, 1942 |
| 2,648,442 | Lowmaster | Aug. 11, 1953 |
| 2,747,567 | Goodwin | May 29, 1956 |
| 2,816,538 | Miller et al. | Dec. 17, 1957 |
| 2,819,669 | Victor | Jan. 14, 1958 |

FOREIGN PATENTS

| | | |
|---|---|---|
| 553,696 | Great Britain | June 1, 1943 |
| 561,618 | Great Britain | June 25, 1944 |